Sept. 17, 1935. H. E. WIKERT 2,015,054
CONVERTIBLE VEHICLE BOX AND RACK
Filed March 19, 1934 3 Sheets-Sheet 2
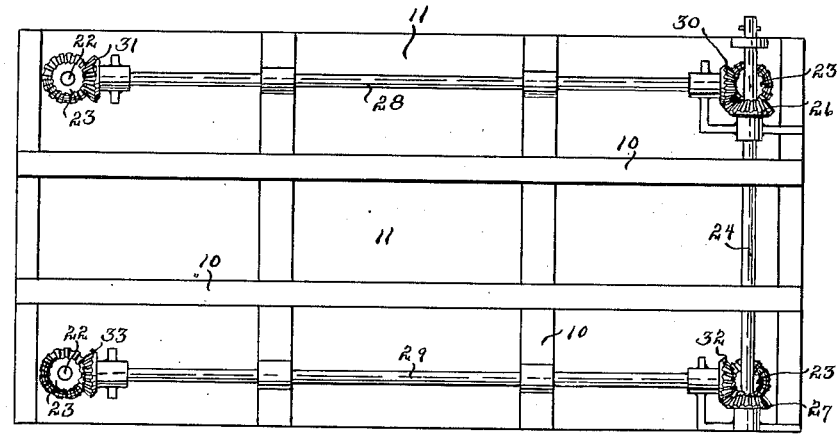
Fig. 2.
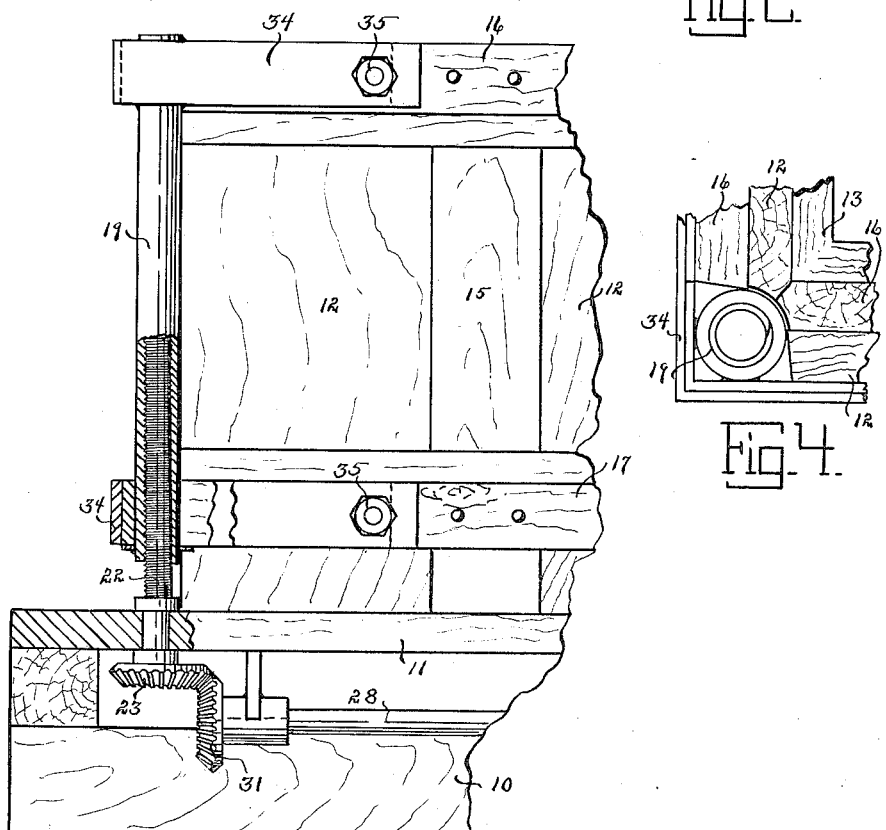
Fig. 3.
Fig. 4.
INVENTOR.
H. E. WIKERT
BY
M. Talbert Dick
ATTORNEY.

Sept. 17, 1935. H. E. WIKERT 2,015,054
CONVERTIBLE VEHICLE BOX AND RACK
Filed March 19, 1934 3 Sheets-Sheet 3
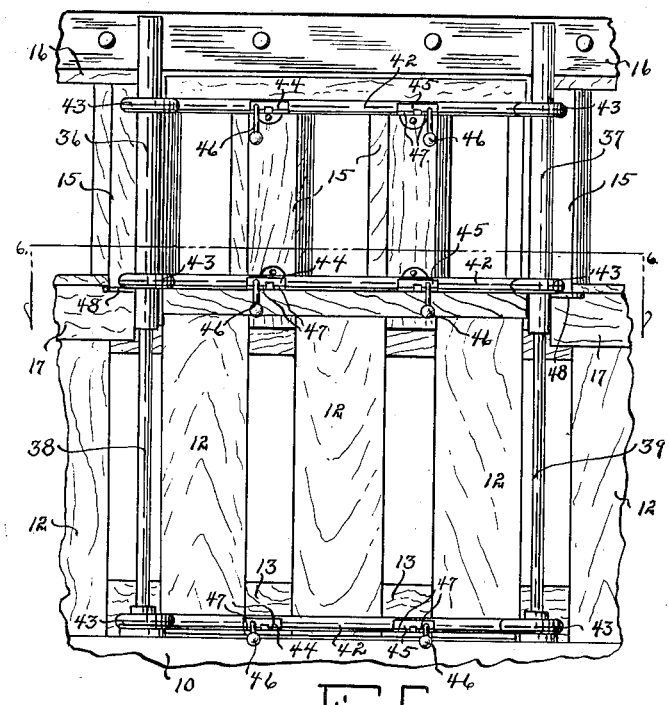
Fig. 5.
Fig. 7.
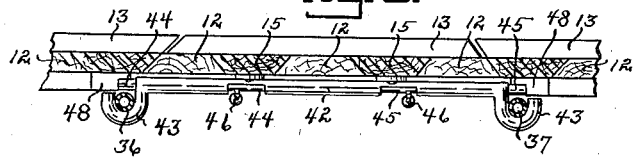
Fig. 6.
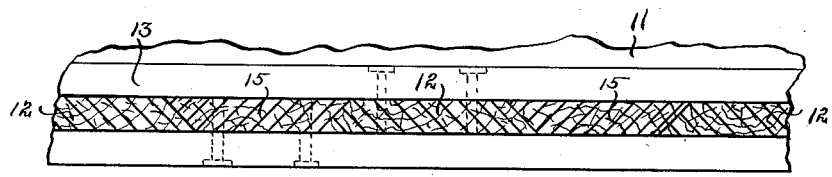
Fig. 8.
INVENTOR.
H. E. WIKERT
BY
*M. Talbert Dick*
ATTORNEY.

Patented Sept. 17, 1935

2,015,054

UNITED STATES PATENT OFFICE 2,015,054

CONVERTIBLE VEHICLE BOX AND RACK

Harry E. Wikert, Graettinger, Iowa, assignor of one-half to Robert Elsenbast and one-fourth to Glen F. Shaver, both of Graettinger, Iowa Application March 19, 1934, Serial No. 716,283

3 Claims. (Cl. 296—10)

The principal object of my invention is to provide a carrying box for vehicles that may be easily and quickly converted from a rack box construction to a tight box for hauling granular material or like and as easily and quickly converted from a tight box construction to a rack box for hauling animals and the like.

A further object of this invention is to provide a carrying box for vehicles that may be adjusted to various heights.

A still further object of my invention is to provide a combination vehicle tight box and rack box that may be easily changed from one to the other by a single workman.

A still further object of this invention is to provide a combination vehicle box and rack that is of exceptionally strong construction.

A still further object of my invention is to provide a vehicle carrying box of adjustable height that is operated by a single crank arm.

A still further object of my invention is to provide a convertible vehicle box and rack that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 2 is a bottom view of my box showing the operating shafts and gears.

Fig. 3 is a corner portion of my box with sections cut away to illustrate the lowering and raising mechanism.

Fig. 4 is a top plan view of one corner of my vehicle box.

Fig. 5 is a rear view of the end gate portion of the vehicle box.

Fig. 6 is a cross-sectional view of the end gate portion of the vehicle box taken on line 6—6 of Fig. 5 and more fully illustrates its construction.

Fig. 7 is a vertical view of the lower portion of one of the end gate supporting members with an end gate securing member thereon.

Fig. 8 is a cross-sectional view of my box taken on line 8—8 of Fig. 1.

Figure 1:
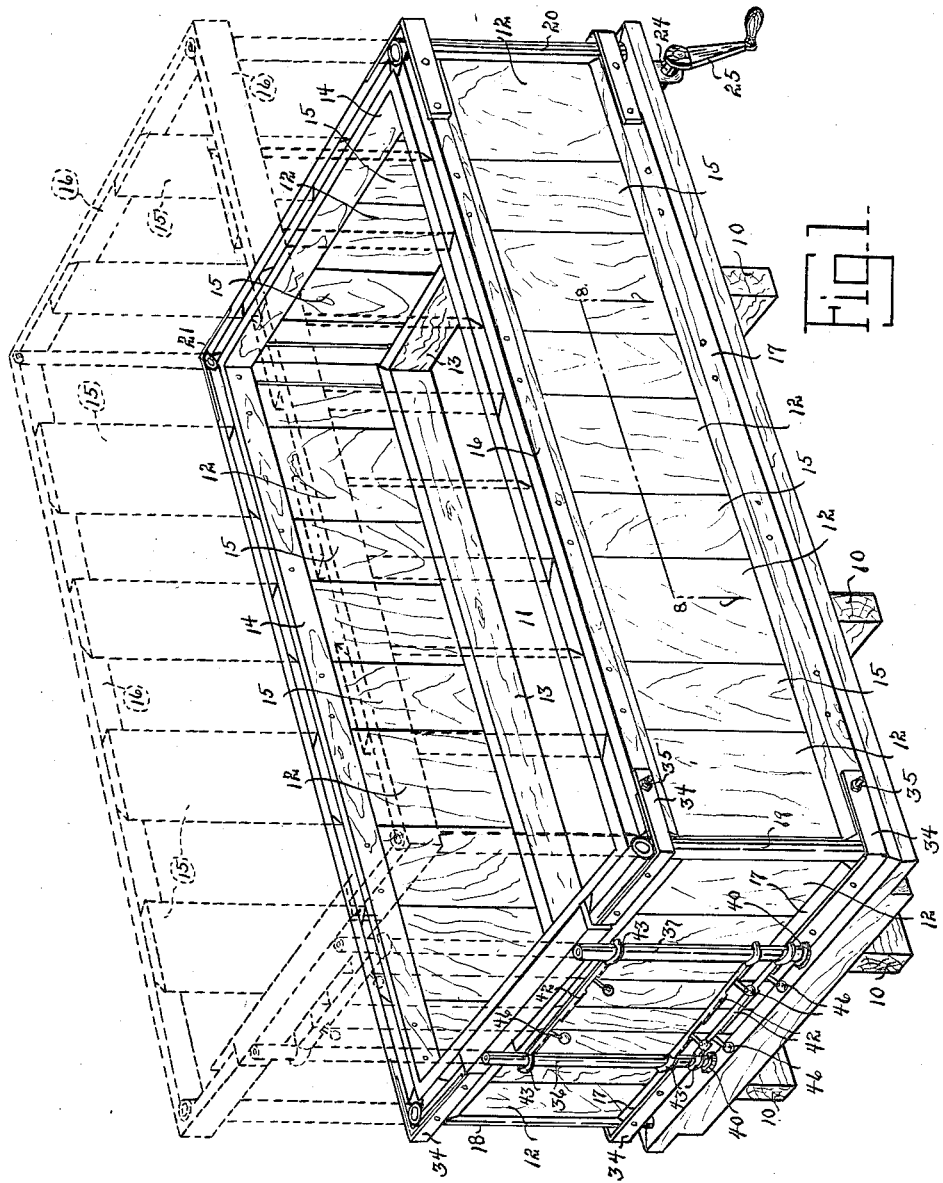
Fig. 1 is a perspective view of my box in a lowered tight condition, with dotted lines showing its construction when in an elevated rack condition.

For the transportation of diversified material by vehicles it is necessary to employ differently constructed and arranged carrying boxes. All granular material such as grain, sand, and the like must be transported in comparatively tight boxes, while the transportation of live stock, hay, and the like requires not only an open type rack box, but one of comparatively large capacity. Heretofore, this desirability of various types of vehicle boxes has been overcome by having several different types of boxes which may be detachably secured to the vehicle. This, of course, is objectionable not only from a cost standpoint, but in many instances in the trucking of merchandise it is desired to haul one type of merchandise to a certain point and return with a different type of merchandise or material. I have overcome such disadvantages and objections by providing a box that may be easily converted into a tight box or ventilated, enlarged rack box, or adjusted as a combination of the two.

Referring to the drawings, I have used the numeral 10 to designate the bottom frame of my combination box. The numeral 11 designates the box bottom secured on top of the frame 10. The numeral 12 designates a plurality of spaced apart vertical slats secured to and around the floor 11. These slats 12 are unmovable, of a predetermined height above the floor 11, and each has its side edges beveled, as shown in Fig. 8. The numeral 13 designates a beveled molding secured on the inner side of the slats 12 and adjacent the floor 11. The numeral 14 designates a brace and guide beam secured on the inner side of all the slats 12 and near their tops respectively. The numeral 15 designates vertical slidable slats, which with the slats 12 form the general sides and end portions of the rectangular box.

These slats 15 are positioned between the slats 12, as shown in the drawings and have a width substantially less than the width of the slats 12. It will also be recognized that these slats 15 have their sides beveled transversely of the bevel of the sides of the slats 12 in order that they may properly slidably engage the slats 12. This makes for a tight box when the slats 15 are in a lowered condition, and by the slats 12 being beveled outwardly and to the side, any material in the box will tend to force the slats 15 into tight wedged engagement with the slats 12. By the slats 15 being of less width than the slats 12 they will bend and give more under pressure than the stationary slats 12. Also, the spaces between the fixed slats 12 will accordingly be reduced, thereby eliminating undesired excessive space between the slats 12 that might otherwise permit large objects to pass through or permit animals to accidentally protrude their feet through, when the movable slats 15 are in an elevated condition.

The numeral 16 designates an embracing frame secured to the outside upper portions of the slats 15. The numeral 17 designates a similar embracing frame secured to the outside bottom portions of the slats 15. The numerals 18, 19, 20, and 21 designate a vertical pipe at each of the four corners of the box respectively. These pipes are rigidly secured to the frames 16 and 17 and therefore operatively connected to all the movable slats 15. The numeral 22 designates a vertical rotatably mounted shaft threaded into the bottom of each of the pipes 18, 19, 20, and 21. These shafts are held by any suitable method against longitudinal sliding movement and extend to a point below the box bottom 11, as shown in Fig. 3. The numeral 23 designates a bevel gear rigidly secured on the bottom end of each of the shafts 22.

The numeral 24 designates a horizontal shaft journaled below the bottom end portion of the box. This shaft 24 extends transversely of the longitudinal axis of the box and has a detachable crank arm 25 on one end which extends to one side of the box, as shown in Fig. 1. The numerals 26 and 27 designate two spaced apart bevel gears on the shaft 24 which are in engagement with the two bevel gears 23 on the two shafts 22 at that end of the box, as shown in Fig. 2. The numerals 28 and 29 designate two spaced apart shafts journaled on the outside bottom of the box 10 and extending longitudinally of the box. The shaft 28 has a bevel gear 30 on one of its ends in engagement with the bevel gear 26, and a bevel gear 31 on its other end in engagement with the bevel gear 23 on one of the shafts 22 that is located at one of the box corners opposite the end portion to which the shaft 24 is journaled. The shaft 29 has a bevel gear 32 on one of its ends in engagement with the bevel gear 27 and a bevel gear 33 on its other end in engagement with the bevel gear 23 on the remaining vertical shaft 22.

By this arrangement of parts the rotation of the shafts 22 which are held against sliding movement, will cause the pipes 18, 19, 20, and 21 to lower or raise relative to the bottom of the box. As the pipes 18, 19, 20, and 21 are operatively connected to the vertically movable slats 15, the slats 15 as a group, will lower or raise with the pipes 18, 19, 20, and 21. As the shafts 22 are operatively geared to the shaft 24 the manual rotation of the shaft 24 by the hand crank 25 will cause the vertical movement of the slats 15. If the crank arm 25 is turned in one direction the slats 15 will be lowered and if turned in the opposite direction the slats 15 will be raised.

When it is desired to haul cattle, horses, hay, or like, the slats 15 are moved to their extreme upward position, as shown by dotted lines in Fig. 1. In the hauling of hogs or like it may be merely necessary to only raise the slats 15 to a position where a slight amount of air can pass under them and into the box. Such a position of the slats is shown in Fig. 3. If it is desired to haul granular material such as grain, gravel, or like, the slats 15 should be moved to their extreme lowered position, as shown in Fig. 1. When traveling without anything in the box it should be in a lowered condition in order to reduce wind resistance. Also, the lowering and raising of the box as hereinbefore described, permits the vehicle to drive through or into doors of normal heights, which would not be the case if the rack portion of the box was of the non-lowerable type.

In some instances it may be desirable, when loading or unloading, to remove the complete rear end portion of the box. This is accomplished in my box by detachably connecting the entire rear end portion with bolted angle irons 34. These angle irons 34 are rigidly connected to the members 16 and 17 and extend around each corner of the rear end of the box to engage the members 16 and 17 at each side of the box respectively, as shown in Figs. 3 and 4. The angle irons 34 are detachably secured to the members 16 and 17 at each side of the wagon box by bolts 35. By this arrangement of parts, when it is desired to remove the entire rear end of the box it is merely necessary to remove the bolts 35 and release the angle irons 34. The rear end portion of the box may be as easily replaced.

I will now describe the construction of the end gate and the rear end portion of the box. The numerals 36 and 37 designate two downwardly extending tubes having their upper ends rigidly secured to the member 16, as shown in the drawings. These tubes 36 and 37 are positioned at each side of the end gate proper. The numerals 38 and 39 designate two rods slidably mounted inside the tubes 36 and 37 respectively. These rods 38 and 39 are each rigidly secured to a bearing member 40, which is in turn rigidly secured to the base 10 of the box, as shown in Fig. 5 and Fig. 7. These bearing members 40 have a horizontal projection 41. The general parts of the end gate proper, as shown in Fig. 5, have the same numerals designating similar parts that are found in the box construction herebefore described. The numeral 42 designates a tubular member rigidly secured to the non-movable slats 12 near their lower ends. This tubular member has a hook portion 43 at each of its ends capable of partially embracing the upper cylindrical portion of the two bearing members 40 respectively. The numerals 44 and 45 designate two rods slidably and rotatably mounted in the tube 42 and capable of extending from each end of the tube 42 in advance of its hook end portions 43. The numeral 46 designates a handle member secured to each of the rods 44 and 45. These handle members each extend through a broken away portion in the tube 42 and facilitate the manual rotation and sliding of the rods. Notches 47 are provided in the broken away portions of the tube 42 to receive the handle members 46 and prevent accidental sliding movement of the rods 44 and 45. This makes it necessary, when it is desired to manually slide the rods 44 and 45, to raise the handle members 46 upwardly to clear the holding notches 47.

When the rods 44 and 45 are slid and locked in an outward position they will protrude beyond the straight portion of the tube 42 and will, with the hook portions, successfully embrace the two bearing members 40, as shown in the drawings. One the other hand, if the rods 44 and 45 are slid inwardly and toward each other they will disappear within the tube 42 and the lower end of the gate will then be detachable from the two bearing members 40. When the rods are at their extreme outward sliding movement the lower portion of the end gate will not only be rigidly secured to the bearing members 40, but due to the fact that the rods 44 and 45 will be under the projection 41 of each of the bearing members, the lower portion of the gate, which may be considered as the non-movable portion of the gate, will be prevented from undesirable upward movement.

A similar tube with hook portions and slidable rod members is rigidly secured to the lower portions of the slats 15. In this instance, however, the slidable rods 44 and 45, when in an outward position, engage the top surface of plate members 48 on the member 17, as shown in Fig. 6. By this arrangement of parts, the slats 15 of the end gate will lower and raise automatically with the slats 15 of the main box. The hook portions of the tube secured to the lower portions of the gate slats 15 and rods slidably mounted in the tube detachably embrace the two tubes 36 and 37. A similar tube having hook end portions and slidable rods is secured to the upper portions of the slats 15, as shown in the drawings. The hook portions of this tube and its slidably mounted rods detachably embrace the tubes 36 and 37.

From the foregoing description of my end gate it will be appreciated that the complete end gate may be removed when all of the rods 44 and 45 are moved inwardly and by detaching either side of the end gate, it can swing outwardly in the manner of a door. By being similarly secured at each side the end gate can be caused to swing outwardly in the form of a door from either of its sides. If it is desired that the slats 15 not elevate with the slats 15 of the main box, it is merely necessary to secure the hook portions of the tubes secured to the end gate slats 15 to and around the rods 38 and 39 and below the member 17 of the main box in order to not engage the plates 48. It will readily be seen that I have provided a very desirable vehicle box and one that can be easily adjusted as to height and when once adjusted will be rigidly held in such adjustment until it is desired to change it.

Some changes may be made in the construction and arrangement of my improved convertible vehicle box and rack without departing from the real spirit and purpose of my invention, and it is my intention to cover by my claims any modified forms of structure or use of mechanical equivalents which may be reasonably included within their scope.

I claim:

1. In a device of the class described, a floor, a plurality of fixed upwardly extending elongated spaced apart slats, and a plurality of vertically elongated slats slidably disposed between said plurality of fixed slats respectively, said last-mentioned slats when in full lowered positions forming with said first-mentioned slats a solid box and when in elevated positions forming with said first-mentioned slats a rack box.

2. In a device of the class described, a floor, a plurality of spaced apart vertical slats secured to said floor and having their side edges beveled, and a plurality of vertically extending elongated slats slidably disposed between said first-mentioned plurality of slats respectively having their side edges beveled to conform with the beveled side edges of said first-mentioned slats.

3. In a convertible vehicle box and rack, a floor base, a plurality of spaced apart slats fixed to said floor base and having their longitudinal lengths extending in a vertical plane, a frame, a second plurality of spaced apart slats secured to said frame slidably disposed in the spaces between said first-mentioned slats respectively and having their longitudinal lengths extending in a vertical plane; said second plurality of slats capable when in lowered positions of forming with said first-mentioned slats a solid box and when slid upwardly to elevated positions capable of forming with said first-mentioned slats a rack box of a depth substantially greater than that of the depth of the solid box formed by the first and second-mentioned slats when said second-mentioned slats are in lowered positions.

HARRY E. WIKERT.